(12) United States Patent
Samuel

(10) Patent No.: US 10,975,679 B2
(45) Date of Patent: Apr. 13, 2021

(54) DRILLING MODELING CALIBRATION, INCLUDING ESTIMATION OF DRILL STRING STRETCH AND TWIST

(71) Applicant: HALLIBURTON ENERGY SERVICES, INC., Houston, TX (US)

(72) Inventor: Robello Samuel, Cypress, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 451 days.

(21) Appl. No.: 15/037,298

(22) PCT Filed: Dec. 17, 2013

(86) PCT No.: PCT/US2013/075560
§ 371 (c)(1),
(2) Date: May 17, 2016

(87) PCT Pub. No.: WO2015/094174
PCT Pub. Date: Jun. 25, 2015

(65) Prior Publication Data
US 2016/0281490 A1  Sep. 29, 2016

(51) Int. Cl.
*E21B 7/04* (2006.01)
*E21B 44/00* (2006.01)
(Continued)

(52) U.S. Cl.
CPC .............. *E21B 44/00* (2013.01); *E21B 7/04* (2013.01); *E21B 7/10* (2013.01); *E21B 41/00* (2013.01);
(Continued)

(58) Field of Classification Search
CPC ............. E21B 44/00; E21B 44/04; E21B 7/04
See application file for complete search history.

(56) References Cited

U.S. PATENT DOCUMENTS 6,109,370 A * 8/2000 Gray ....................... E21B 7/065
  175/215
6,443,242 B1  9/2002 Newman et al.
(Continued)

FOREIGN PATENT DOCUMENTS

CN  101333923 A  12/2008
CN  101600851 A  12/2009
(Continued)

OTHER PUBLICATIONS

International Search Report and Written Opinion, dated Apr. 21, 2014, 10 pages, United States and Patent Trademark Office.
(Continued)

*Primary Examiner* — Robert E Fuller
*Assistant Examiner* — Lamia Quaim

(57) ABSTRACT

This disclosure is related to real-time calibration of drilling modeling programs and to the estimation of pipe stretch to perform corrections for the inclination and azimuth measurements and the estimation of pipe twist to perform corrections to the tool face setting. A measurement tool with a plurality of sensors is disposed along the drill string. Measurements are taken continuously during the drilling process from each of the sensors to determine torque, bending moment, and axial force data. This information is iteratively coupled with a mechanical torque-drag model (based on standard mechanics of deformable materials and on wellbore mechanics) to accurately estimate stretching and twisting of the drill string in real-time or near-real-time and thereby promote accurate wellbore placement.

17 Claims, 7 Drawing Sheets

(51) Int. Cl.
  *E21B 44/04* (2006.01)
  *E21B 41/00* (2006.01)
  *E21B 47/022* (2012.01)
  *E21B 7/10* (2006.01)
  *E21B 47/024* (2006.01)
  *G05B 17/02* (2006.01)
  *G01L 5/00* (2006.01)

(52) U.S. Cl.
  CPC ............ *E21B 44/04* (2013.01); *E21B 47/022* (2013.01); *E21B 47/024* (2013.01); *G05B 17/02* (2013.01); *G01L 5/0061* (2013.01)

(56) References Cited

U.S. PATENT DOCUMENTS

| | | | |
|---|---|---|---|
| 7,823,658 | B2 | 11/2010 | Hartmann et al. |
| 8,362,915 | B2 | 1/2013 | Mehta et al. |
| 2002/0139527 | A1* | 10/2002 | Song ................ E21B 47/022 166/255.1 |
| 2005/0194185 | A1* | 9/2005 | Gleitman ............ E21B 17/003 175/45 |
| 2008/0314641 | A1 | 12/2008 | McClard |
| 2009/0152005 | A1 | 6/2009 | Chapman et al. |
| 2010/0044033 | A1* | 2/2010 | Menon ................ E21B 41/00 166/250.01 |
| 2010/0307742 | A1 | 12/2010 | Phillips et al. |
| 2011/0174541 | A1 | 7/2011 | Strachan et al. |
| 2011/0186353 | A1* | 8/2011 | Turner ................ G05B 13/048 175/40 |
| 2011/0213601 | A1* | 9/2011 | Pirovolou ............ E21B 7/04 703/10 |
| 2013/0161096 | A1 | 6/2013 | Benson et al. |
| 2014/0262514 | A1* | 9/2014 | Beylotte ............. E21B 44/00 175/40 |

FOREIGN PATENT DOCUMENTS

| | | |
|---|---|---|
| CN | 101730855 A | 6/2010 |
| CN | 101868595 A | 10/2010 |
| CN | 102822752 A | 12/2012 |
| WO | WO-2013126074 A1 | 7/2011 |

OTHER PUBLICATIONS

Canadian Intellectual Property Office, Office Action, dated Mar. 22, 2018, 6 pages, Canada.
Norwegian Patent Office, Application No. 20160850, Office Action, English Translation, dated Aug. 6, 2018, 7 pages, Norway.
Norwegian Patent Office, Application No. 20160850, Office Action, dated Aug. 2, 2018, 7 pages, Norway.
Norwegian Patent Office, Norwegian Search Report, dated Aug. 2, 2018, 2 pages, Norway.
Yousif E.A. Bagadi, Abdelwahab M. Fadol & Prof. Gao Deli, A Study on Effect of Drag & Torque on Buckling of Drillstring in Horizontal Wells, International Journal of Research and Reviews in Applied Sciences, Apr. 2012, 11 pages, vol. 1, Issue I, Faculty of Petroleum Engineering, China University of Petroleum-Beijing, China.
Chinese State Intellectual Property Office, Application No. 201380080969.8, Office Action, dated Sep. 25, 2018, 6 pages, China.
Chinese State Intellectual Property Office, Application No. 201380080969.8, Search Report, dated Sep. 14, 2018, 2 pages, China.
Chinese State Intellectual Property Office, Application No. 201380080969.8, Third Office Action, dated Apr. 3, 2020, 5 pages, China.
Chinese State Intellectual Property Office, Application No. 201380080969.8, Search Report, dated Mar. 29, 2020, 2 pages, China.
Canada Patent Office, Office Action, Application 2,930,528, dated Jun. 2, 2020, 5 pages, Canada.
G.Robello Samuel and Kaiwan Bharucha, Yuejin Luo, Tortuosity Factors for Highly Tortuous Wells: A Practical Approach, Feb. 23-25, 2005, 6 pages, SPE/IADC Drilling Conference, SPEC/IADC 92565, Amsterdam, The Netherlands.

\* cited by examiner

DRILLING MODELING CALIBRATION, INCLUDING ESTIMATION OF DRILL STRING STRETCH AND TWIST

CROSS-REFERENCE TO RELATED APPLICATIONS

This application is a U.S. national stage patent application of International Patent Application No. PCT/US2013/075560, filed on Dec. 17, 2013, the benefit of which is claimed and the disclosure of which is incorporated herein by reference in its entirety.

TECHNICAL FIELD

The present disclosure relates generally to methods and apparatus used in drilling wellbores for hydrocarbon production. More specifically, the disclosure relates to methods and systems for providing accurate wellbore placement by improving the accuracy of mathematical modeling of wellbore and drilling operations, including the estimation of stretch and twist of a drill string.

BACKGROUND

To obtain hydrocarbons such as oil and gas, wellbores are typically drilled by rotating a drill bit that is attached at the end of the drill string. Modern drilling systems frequently employ a drill string having a bottom hole assembly and a drill bit at an end thereof. The drill bit is rotated by a downhole motor of the bottom hole assembly and/or by rotating the drill string. Pressurized drilling fluid is pumped through the drill string to power the downhole motor, provide lubrication and cooling to the drill bit and other components, and carry away formation cuttings.

A large proportion of drilling activity involves directional drilling, e.g., drilling deviated, branch, and/or horizontal wellbores. In directional drilling, wellbores are usually drilled along predetermined paths in order to increase the hydrocarbon production. As the drilling of the wellbore proceeds through various formations, the downhole operating conditions may change, and the operator must react to such changes and adjust parameters to maintain the predetermined drilling path and optimize the drilling operations. The drilling operator typically adjusts the surface-controlled drilling parameters, such as the weight on bit, drilling fluid flow through the drill string, the drill string rotational speed, and the density and/or viscosity of the drilling fluid, to affect the drilling operations. For drilling a wellbore in a virgin region, the operator typically has seismic survey plots, which provide a macroscopic picture of the subsurface formations along the pre-planned wellbore path. If multiple wellbores are to be drilled in the same formation, the operator also has information drawn from any previously drilled wellbores.

Drilling operations are often conducted in accordance with one or more drilling or pre-drilling models of the subterranean conditions along the intended path of the wellbore. The following is a non-exclusive list of some of the variables various models may take into consideration: Wellbore properties, such as wellbore geometry, temperature and diameter versus the wellbore depth; friction, including dynamic and static friction coefficients throughout the wellbore; pressures, viscosities, densities, and flow rates of the fluids inside and outside of the drill string; material properties, such as strength and elastic modulus of the drill string components; inside and outside diameters along the length of the drill string; torque and force applied at the surface; tool properties, such as the length, outside diameter, stiffness, internal diameter, and flow restrictions in the tools being conveyed by the drill string, if any; and finally, the axial and rotational speeds of drill string and bit.

Computer-based models have been developed to calculate many quantities such as the forces, stresses, torques, stretch, etc. associated with the drill string or other conveyance, such as coiled tubing. One such model is used to calculate torque and drag. Torque and drag result from contact between the drill string and side walls of the wellbore, and as such they relate to wellbore resistance and drill string sticking. Torque-drag modeling may be used to determine when the drill string is approaching a limit at which it may break or buckle; how much force, either tension or in compression, the drill string can apply at its downhole end; how much torque is being applied at the downhole end given a certain torque applied at surface; how much twist is in the drill string between the surface and the downhole end; the torsional and axial dynamic frequencies for stick-slip-type movements; and how much the drill string length will stretch or compress due to axial forces, twisting, temperature, pressure, and helical buckling, for example.

Knowledge of the change in drill string length may be needed to accurately calculate the depth of the drill string end or the location of a tool it may be conveying. Similarly, knowledge of the amount of twist in a drill string may be necessary to ensure accurate tool face placement. For these reasons, mathematical simulations using torque-drag computer modeling programs provide useful data, which is not available by simply monitoring drill string torque and hook load at the surface.

BRIEF DESCRIPTION OF THE DRAWINGS

Embodiments are described in detail hereinafter with reference to the accompanying figures, in which.

DETAILED DESCRIPTION

It may be desirable to run drilling simulation models in real-time or near-real-time (depending on the computational difficulty) while drilling, using various measured properties acquired during drilling as input to the model in order to calculate one or more values, such as a depth correction, WOB, etc. for use in the ongoing drilling operations. Such calculated values are then available to those operating the drilling system along with the measured properties. The drilling modeled data may be compared to actual or measured data or pre-drilling modeled data to provide valuable insight into the formation and drilling operation. For example, measured wellbore data may be sent to the surface during drilling, processed at the surface to update or recalibrate the existing model, and the drilling control program modified in accordance with the updated model.

For correct wellbore placement and field development, accurate measurement of the location of the drill bit is important. Also, for proper tool face setting, accurate measurement of the twist in the drill string is necessary. If these measurements are not taken into account or are otherwise not accurate, the values of the calculated true vertical depth and the measured depth are likely to be erroneous.

Figure 1:
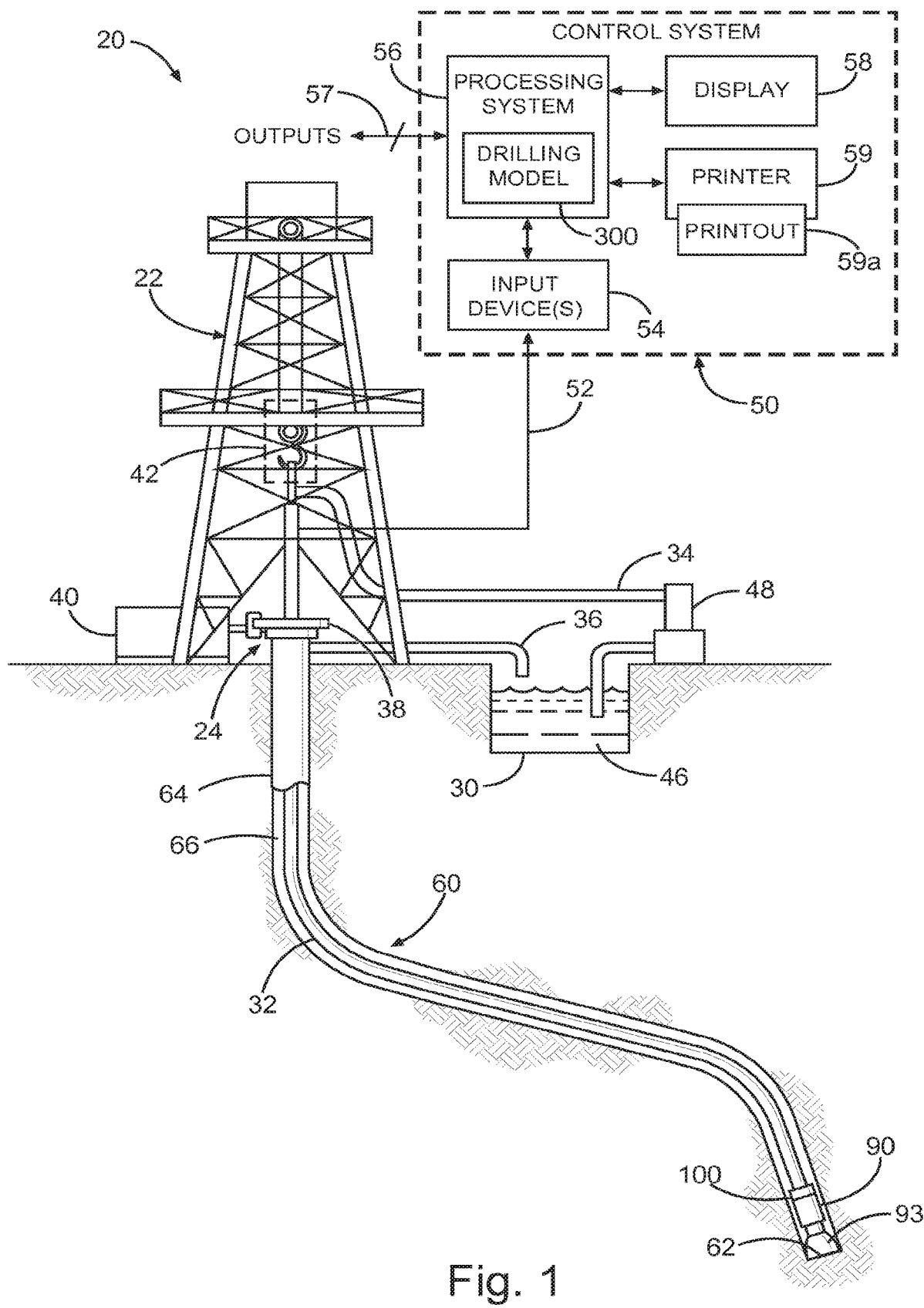
FIG. 1 is an elevation view in partial cross-section of a drilling system according to an embodiment, showing a drill string and a drill bit for drilling a wellbore in the earth and a measurement tool disposed in a drill string for measuring weight on bit, torque on bit, and bending on bit, i.e., bending moments at the bit.

FIG. 1 shows a directional drilling system 20 of the present disclosure. Drilling system 20 may include land drilling rig 22. However, teachings of the present disclosure may be used in association with offshore platforms, semi-submersible, drill ships and any other drilling system satisfactory for forming a wellbore extending through one or more subterranean formations.

Drilling rig 22 and associated control system 50 may be located proximate to wellbore head 24. Drilling rig 22 may include rotary table 38, rotary drive motor 40 and other equipment associated with rotation of drill string 32 within wellbore 60. Annulus 66 is formed between the exterior of drill string 32 and the inside diameter of wellbore 60. For some applications drilling rig 22 may also include top drive motor or top drive unit 42. Blowout preventers (not expressly shown) and other equipment associated with drilling a wellbore may also be provided at wellbore head 24.

The lower end of drill string 32 may include a bottom hole assembly (BHA) 90 that carries at a distal end a rotary drill bit 93. Drilling fluid 46 may be pumped from reservoir 30 by one or more pumps 48, through conduit 34, to the upper end of drill string 32 extending out of wellbore head 24. The drilling fluid 46 then flows through the longitudinal interior of drill string 32, through BHA 90, and exits from nozzles formed in rotary drill bit 93. At bottom end 62 of wellbore 60, drilling fluid 46 may mix with formation cuttings and other downhole fluids and debris proximate drill bit 93. The drilling fluid mixture then flows upwardly through annulus 66 to return formation cuttings and other downhole debris to the surface. Conduit 36 may return the fluid to reservoir 30, but various types of screens, filters and/or centrifuges (not expressly shown) may be provided to remove formation cuttings and other downhole debris prior to returning drilling fluid to pit 30. Various types of pipes, tube and/or conduits may be used to form conduits 34 and 36.

Bottom hole assembly 90 may include various subs, motors, stabilizers, drill collars, measurement while drilling (MWD) or logging while drilling (LWD) tools, or similar equipment as known in the art. Such tools may be placed in close proximity to drill bit 93 or otherwise deployed in BHA 90 to measure certain downhole operating properties associated with drill string 32 during drilling operations and may include sensors for measuring downhole temperature pressure, azimuth, and inclination, for example, and for determining formation geology and formation fluid conditions, including the presence of hydrocarbons and water, for example.

Measurements of weight on bit, torque on bit, and bending moments at bit may be used to characterize the transfer of energy from the surface, identify the actual drilling parameters being applied to BHA 90 and drill bit 93, and measure the performance of drilling operations. In an embodiment, BHA 90 includes a downhole measurement tool 100 having multiple sensors that deliver information in real-time or near-real-time from the downhole tool location, including weight on bit, torque on bit, and bending moment at bit values. These measurements while drilling may help optimize drilling parameters to maximize performance, minimize wasted energy transfer and vibration, and ensure that the full movement of BHA 90 is assessed during all aspects of the drilling process. In an embodiment, measurement tool 100 is a DrillDOC® drilling downhole optimization collar tool, which is available from the assignee of record of the present disclosure.

Measurement data provided by measurement tool 100 and other information may be communicated from bottom end 62 of wellbore 60 through fluid within drill string 32 or annulus 66 using conventional wellbore telemetry techniques and converted to electrical signals at the surface. This data and information may be monitored and/or processed by a control system 50. For example, electrical conduit or wires 52 may communicate the electrical signals to input device 54. The measurement data provided from input device 54 may then be directed to a data processing system 56. Various displays 58 may be provided as part of control system 50. For some applications, printer 59 and associated printouts 59a may also be used to monitor the performance of drill string 32, bottom hole assembly 90 and associated rotary drill bit 93. Outputs 57 may be communicated to various components associated with the operation of drilling rig 22 and may also be communicated to various remote locations to monitor the performance of drilling system 20. In an embodiment, control system 50 simulates, predicts, analyzes, and/or controls drilling operations using a mathematical drilling model 300, as described in greater detail below.

Although the present disclosure illustrates a single measurement tool 100 being located in BHA 90, in one embodiment measurement tool 100 may be located elsewhere in drill string 32. Further, multiple measurement tools 100 may be employed in drilling system 20, located at multiple points along drill string 32 for example.

Figure 2:
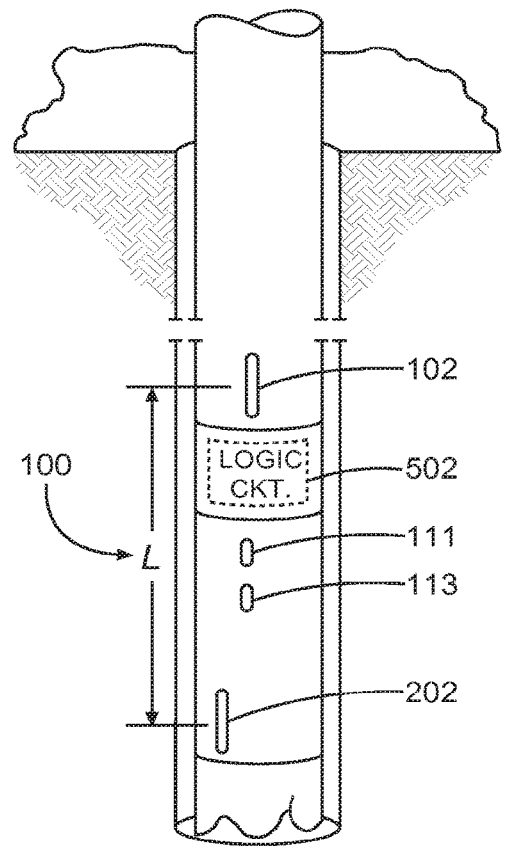
FIG. 2 is an elevation view of the measurement tool of FIG. 1, showing first and second position sensors, force sensors, and bending sensors.

FIG. 2 shows measurement tool 100, which may be in the form of a sub included in drill string 32 (FIG. 1) where the sub transfers a rotational force, causing the sub to experience an incremental torque T. Measurement tool 100 includes at least first and second position sensors 102, 202, such as magnetometers or gyroscopes, that provide information about their orientation and location; one or more bending sensors 111, such as accelerometers, that provide information regarding bending of measurement tool 100 along the x, y, and z axes; and one or more force sensors 113, such as strain gauges, that provide information regarding axial force transferred by measurement tool 100.

First position sensor 102 and second position sensor 202 are separated by a distance L. Before an incremental torque T is applied, position sensors 102, 202 may initially be offset from one another at an initial or base angle, as shown, or they may be aligned azimuthally (not shown).

Figure 3:
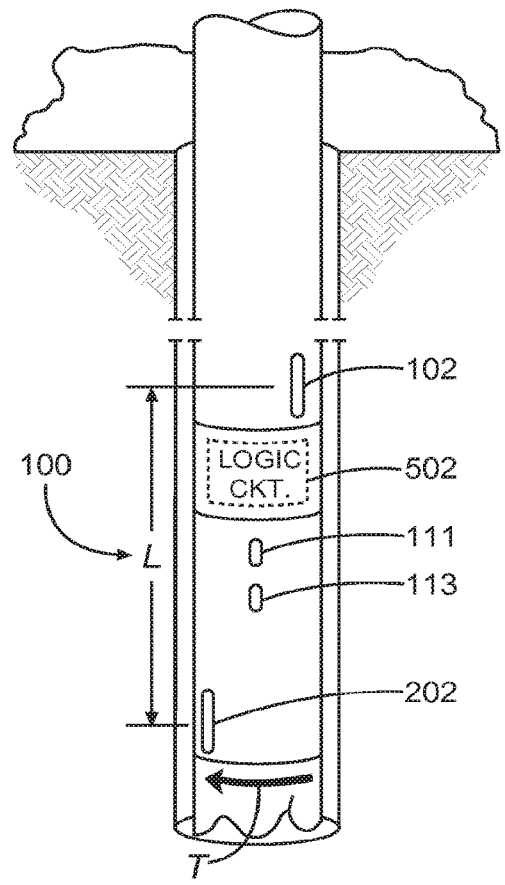
FIG. 3 is a perspective view of the measurement tool of FIG. 2 after an incremental torque has been applied thereto, showing the change in relative angle between the position sensors due to torque-induced twist.

FIG. 3 shows the measurement tool 100 after an incremental torque T has been applied. Because the distance L is relatively short, distance L typically remains substantially unchanged in the presence of torque. However, position sensors 102, 202 of FIG. 3 have experienced a relative rotational movement about the measurement tool 100 due to the incremental torque T. The incremental torque T is the result of an applied rotational force, such as might be present in a drilling operation. The incremental torque T causes position sensors 102, 202 to be further angularly offset from one another. The direction and the magnitude of the movement will vary depending on the incremental torque T and other factors as described below.

Figure 4:
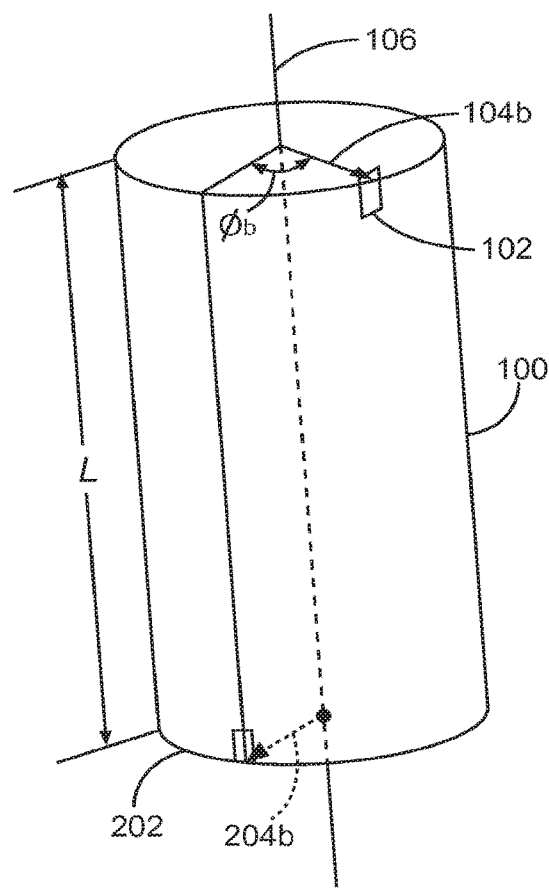
FIG. 4 is a simplified perspective view of the measurement tool of FIG. 2, showing radial vectors based on a base state with no applied torque.
Figure 5:
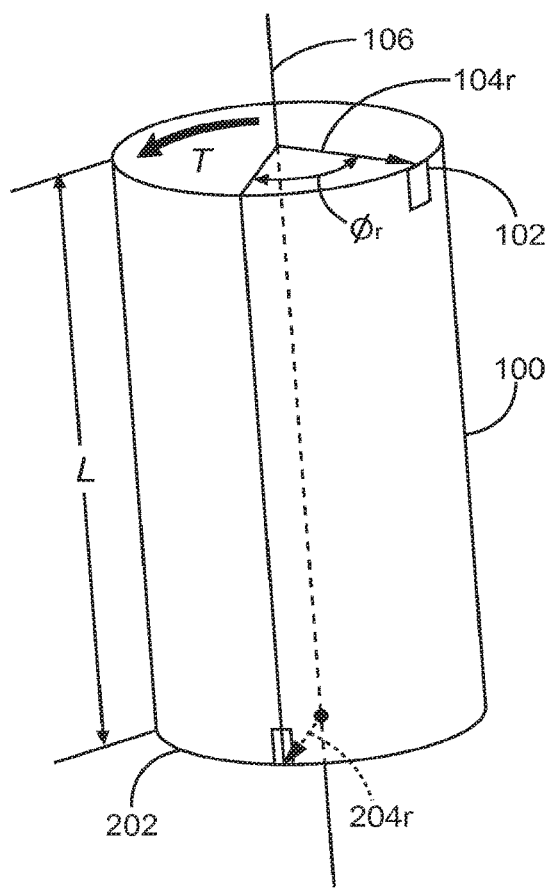
FIG. 5 is a simplified perspective view of the measurement tool of FIG. 3, showing resultant radial vectors from an applied torque.

FIGS. 4 and 5 are simplified perspective views of measurement tool 100 to illustrate the geometry of torque measurement according to a present embodiment. FIG. 4 illustrates measurement tool 100 in a base state in which there is no incremental torque, and FIG. 5 illustrates measurement tool 100 with an applied incremental torque T.

Referring to FIGS. 4 and 5, the incremental torque T can be calculated based on readings from first position sensor 102 and second position sensor 202. Position sensors 102, 202 simultaneously measure directions of a first radial vector that corresponds to the first position sensor 102 and a second radial vector that corresponds to the second position sensor 202. In greater detail, each position sensor 102, 202 provides an indication of which direction it is facing relative to the measurement tool 100. Radial vectors are thus defined extending perpendicularly from a centerline 106 of the measurement tool 100 to corresponding position sensors 102, 202. Centerline 106 is an imaginary reference for the resulting vectors 104r, 204r. The centerline 106 need not be vertical, nor even straight. Indeed, the centerline 106 may be horizontal, or it may curve at any angle.

When no incremental torque is applied to measurement 100 as shown in FIG. 4, base vector 104b corresponds to sensor 102, and base vector 204b corresponds to sensor 202. The radial angle about centerline 106 defined between radial vectors 104b and 204b is denoted as $\varphi_b$. Similarly, when an incremental torque T is applied to measurement tool 100 as shown in FIG. 5, resultant radial vector 104r corresponds to sensor 102, and resultant radial vector 204r corresponds to sensor 202. The radial angle about centerline 106 defined between radial vectors 104r and 204r is denoted as $\varphi_r$.

The direction of the resulting vectors 104r, 204r may translate to azimuths, which may represent directions defined by the projection of the earth's magnetic field on a plane orthogonal to the drill string axis. The azimuths are not necessarily limited to magnetic azimuths, but may be an angle around the wellbore that indicates the direction of maximum sensitivity of position sensors 102, 202.

The application of force resulting in the incremental torque T causes the orientation of position sensors 102, 202 to change. However, the incremental torque T is not the only possible cause of a change in the position of sensors 102, 202. The direction of the sensors 102, 202 also changes when the measurement tool 100 is rotated, even when no torque is present, i.e., when the measurement tool 100 rotates freely, with no constraints. Accordingly, the radial angles defined between the radial vectors, and not the radial vectors themselves, are used to determine the incremental torque T, thereby eliminating any influence caused by directional change resulting from free rotation.

The incremental torque T is calculated using the following equation that takes into account the change in position of position sensors 102, 202 from the base position resulting from the incremental torque T:

$$T=(\varphi_r-\varphi_b)GJ/L \quad \text{(Equation 1)}$$

where the change in change in angle between the sensors 102, 202 due to applied torque is represented by the difference between the resulting angle $\varphi_r$, and the base angle $\varphi_b$, L represents the axial distance between position sensors 102, 202, J is the polar moment of inertia of the portion of the measurement tool 100 between position sensors 102 and 202, and G is the modulus of rigidity of the portion of the measurement tool 100 that lies between position sensors 102 and 202, which relates to the material makeup of the measurement tool 100. Because the length L is relatively short within measurement tool 100, the value L remains substantially constant when incremental torque T is applied.

The incremental torque T may have any units common to torque measurements, such as but not limited to, in. lbs. The angles $\varphi_r$, $\varphi_b$ may have radians as units. However, any appropriate angular units can be used. The modulus of rigidity G is a constant that is readily ascertainable, based on the material used. Modulus of rigidity G may have units of lb./in.$^2$ or any other suitable substitute. The polar moment of inertia J is a function of the cross sectional shape of the measurement tool 100. The polar moment of inertia J may have units of inch$^4$ or any other suitable substitute.

For a uniform tubular cross section, the polar moment of inertia J is given by:

$$J=\pi(d_o^4-d_i^4)/32 \quad \text{(Equation 2)}$$

where $d_o$ is the outer diameter and $d_i$ is the inner diameter of the tubular. However, the polar moment of inertia J is also readily ascertainable for a variable tubular cross section, such as that of a stabilizer. One skilled in the art can determine the polar moment of inertia J for a variety of shapes, as polar moment of inertia J is calculable with well-known formulas.

Each position sensor 102, 202 may have one or more magnetometers, gyroscopes, or any other device capable of measuring the resulting vectors 104r, 204r or the base vectors 104b, 204b. Because magnetometers lose accuracy when the field of measurement is nulled, a single magnetometer may not perform optimally in, for example, a direction of drilling that would cause the sensing field to be minimized. In this instance, multiple devices may be included within each position sensor 102, 202. For example, each position sensor 102, 202 may include a magnetometer, a gyroscopic device, a gravity device, or any other type of device that measures orientation. These measurements may be taken based on magnetic fields, gravity, or the earth's spin axis. This redundancy may allow for directional readings in any position. Multiple devices may also be used to cross-check measurements.

Additionally, position sensors 102, 202 may indicate the quantity $(\varphi_r-\varphi_b)$ by any method, either with or without the use of vectors 104b, 104r, 204b, 204r radiating from the centerline 106. For example, position sensors 102, 202 may indicate relative position by sonic ranging, north seeking gyroscopes, multiple directional instruments, or any other means capable of communicating the position of first position sensor 102 relative to second position sensor 202. Because the quantity $(\varphi_r-\varphi_b)$ can be measured at any point outside the centerline 106, position sensors 102, 202 may be on an inside surface, an outside surface, or within a wall of measurement tool 100.

A torque determination may be based on a single measured point in time, or it may use an average of sensor measurements taken over a period of time. Indeed, during a downhole operation, many measurements may be taken and averaged or otherwise analyzed to find the incremental torque T. These measurements may reflect a constant incremental torque, or these measurements may reflect a changing incremental torque. One skilled in the art will recognize that the number of measurements necessary for statistical accuracy may vary, depending on the actual conditions.

Each position sensor 102, 202, bending sensor 111, and force sensor 113 may provide a signal representative of the measured property to a logic circuit 502 located in measurement tool 100 or to control system 50 located at the earth's surface, which in turn may calculate the incremental torque T from the two position sensors 102, 202, bending moments from bending sensor(s) 111, and axial force from force sensor(s) 113.

Figure 6:
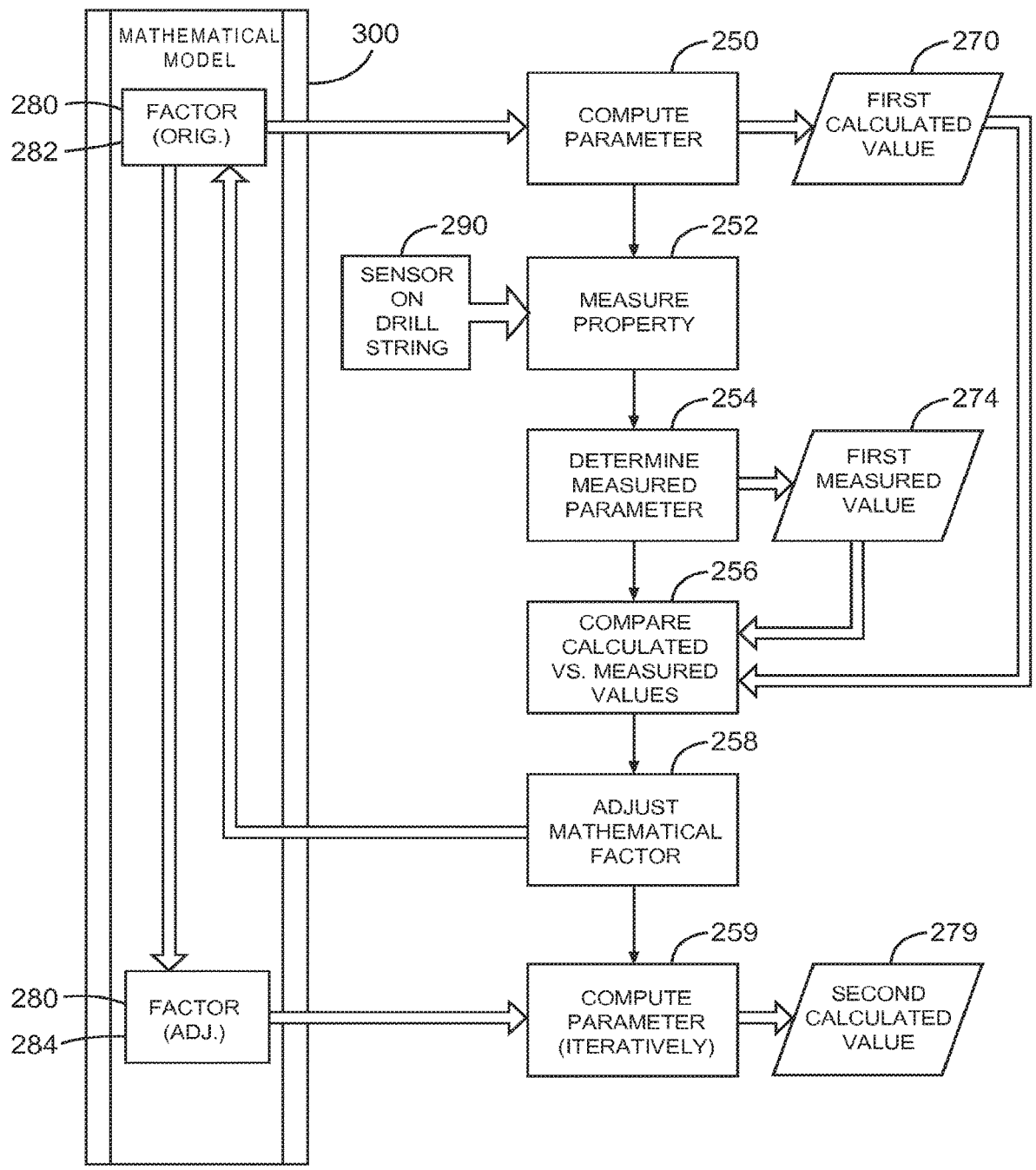
FIG. 6 is a flow chart of a process according to an embodiment for real-time or near-real time calibration of a drilling modeling program thereby allowing more accurate estimation of the degree of twisting and stretching of the drill string of FIG. 1.

FIG. 6 illustrates generally a method for drilling a wellbore with improving drilling modeling and estimation of drill string stretch and twist according to an embodiment. At step 250, a first calculated value 270 of a parameter associated with a particular location along drill string 33 disposed in wellbore 60 (FIG. 1) is computed using mathematical model 300. Mathematical model includes mathematical factor 280. First calculated value 270 is a function of at least mathematical factor 280 when mathematical factor 280 has an original initial magnitude 282. At least one sensor 290 is carried by drill string 32 (FIG. 1) at or near the particular location, and at step 252 sensor 290 measures a property related to the parameter. At step 254, a first measured value 274 of said parameter is determined using the measured property. At step 256, the first calculated value 270 is compared to the first measured value 274, and the magnitude of mathematical factor 280 is corrected at step 258 to an adjusted magnitude 284 based on the comparison of first calculated value 270 to first measured value 274. The process is then repeated. That is, as illustrated by step 259, a second calculated value 279 of the parameter associated with the particular location in drill string 32 (FIG. 1) is computed using mathematical model 300 with mathematical factor 280 having the adjusted or corrected magnitude 284. According to this method, the second calculated value 279 should be closer to the first measured value 274 than the first calculated value 270 was. As the subsequent iteration progresses, the calculated values should approach convergence with the measured values.

Figure 7:
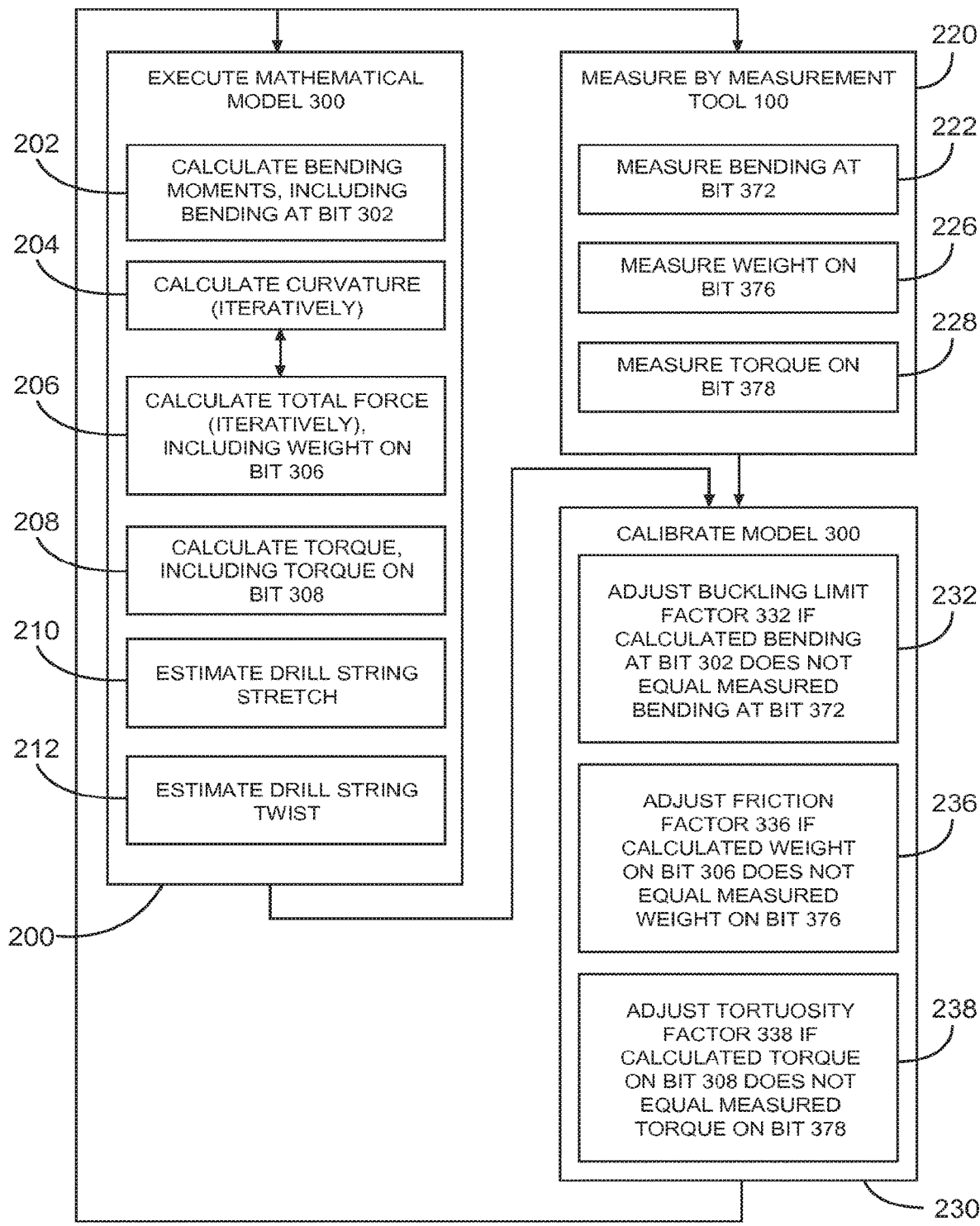
FIG. 7 is a more detailed flow chart of the process of FIG. 6.
Figure 8:
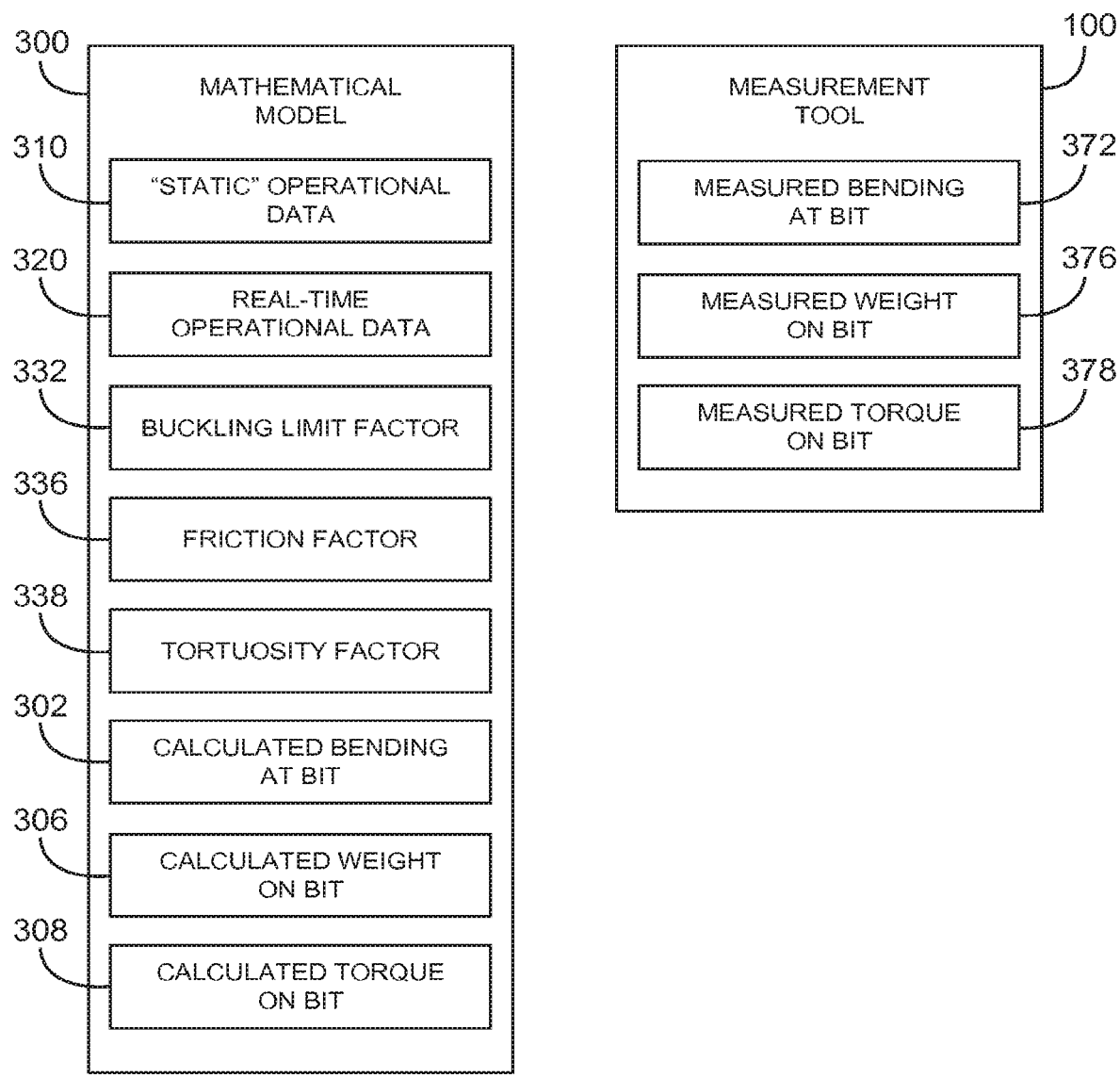
FIG. 8 is a block diagram that illustrates, according to an embodiment, data structures for the measurement tool and drilling model of FIG. 1 that is used in the process of FIG. 7.

FIG. 7 illustrates a method for improving drilling modeling and estimating drill string stretch and twist according to an embodiment. FIG. 8 illustrates a data structure of a mathematical drilling model 300 and measurement tool 100 used in the method of FIG. 7 according to an embodiment. Referring to both FIGS. 7 and 8, at step 200, a drilling simulation is performed using mathematical model 300.

Drilling model 300 may be a torque-drag model, which may be or which may include aspects of an existing torque-drag model known in the art. A seminal model, upon which most other so-called improved or more sophisticated variants are based, is referred to as a soft-string model. The soft-string model considers the entire length of the drill string to be sufficiently soft so that the stiffness of the drill string is not taken into consideration. In particular, the soft string model assumes the drill string to be in continuous contact with the wellbore and ignores the presence of shear forces in the drill string in its force equilibrium calculations. Because the soft-string model ignores the effects of drill string stiffness and wellbore clearance, it is generally characterized by reduced sensitivity to local wellbore crookedness, and accordingly may underestimate torque and drag values.

Other torque-drag models, such as the stiff-string model, incorporate stiffness correction into the basic soft-string model. One technique determines the stiffness of incremental portions of the drill string and uses this information, along with the wellbore clearance and the wellbore trajectory, to determine the contact locations between the drill string and the sidewalls of the wellbore. The contact force at these determined locations may then be calculated, taking into consideration all significant kinematic, external, and internal forces acting on that incremental portion of the drill string. Stiffness correction techniques cause such a model to more closely predict torque and drag, particularly as the stiffness of the BHA increases, as the wellbore clearance decreases, and as the wellbore path becomes more crooked. These models, however, require specific and detailed information about the wellbore path and the friction coefficients, which are difficult to determine, and they are computationally intensive. Other torque-drag mathematical models, including those using finite element analysis techniques, may also be suitable.

Mathematical model 300 may include static or quasi-static operational data 310, such as local magnetic properties, detailed surveys of record, drilling fluid density, and the BHA configuration, for example. Mathematical model 300 may also include operational data 320 that is generated and supplied at a high sample-rate to model 300 in real-time or near-real-time. Real-time data 320 may include time/depth wellbore geometrical data information, drill string rotational speed, surface-measured weight on bit, and wellbore diameter. More specifically, the variables used in mathematical model 300 may include, without limitation: Wellbore properties, such as wellbore geometry; temperature; friction, including dynamic and static friction coefficients throughout the wellbore; pressures, viscosities, densities, and flow rates of the fluids inside and outside of the drill string; material properties, such as strength and elastic modulus of the drill string components; inside and outside diameters along the length of drill string 32 (FIG. 1); torque and force applied at the surface; tool properties, such as the length, outside diameter, stiffness, internal diameter, and flow restrictions in the tools being conveyed by the drill string, if any; and finally, the axial and rotational drill string speeds.

The step 200 of performing a drilling simulation by running mathematical model 300 may include a sub-step 202 of calculating the bending moments along drill string 32. Within the calculation elements used, model 300 includes a buckling limit factor 332 that affects the calculation of the bending moments.

Of the computed bending moments along drill string 32, a particular computed bending moment corresponds with the location of measurement tool 100. That is, it most closely represents the "bending at bit." This particular computed bending moment 302 is compared with a measured bending moment 372 determined by measurement tool 100, as described hereinafter with reference to step 232.

Figure 9:
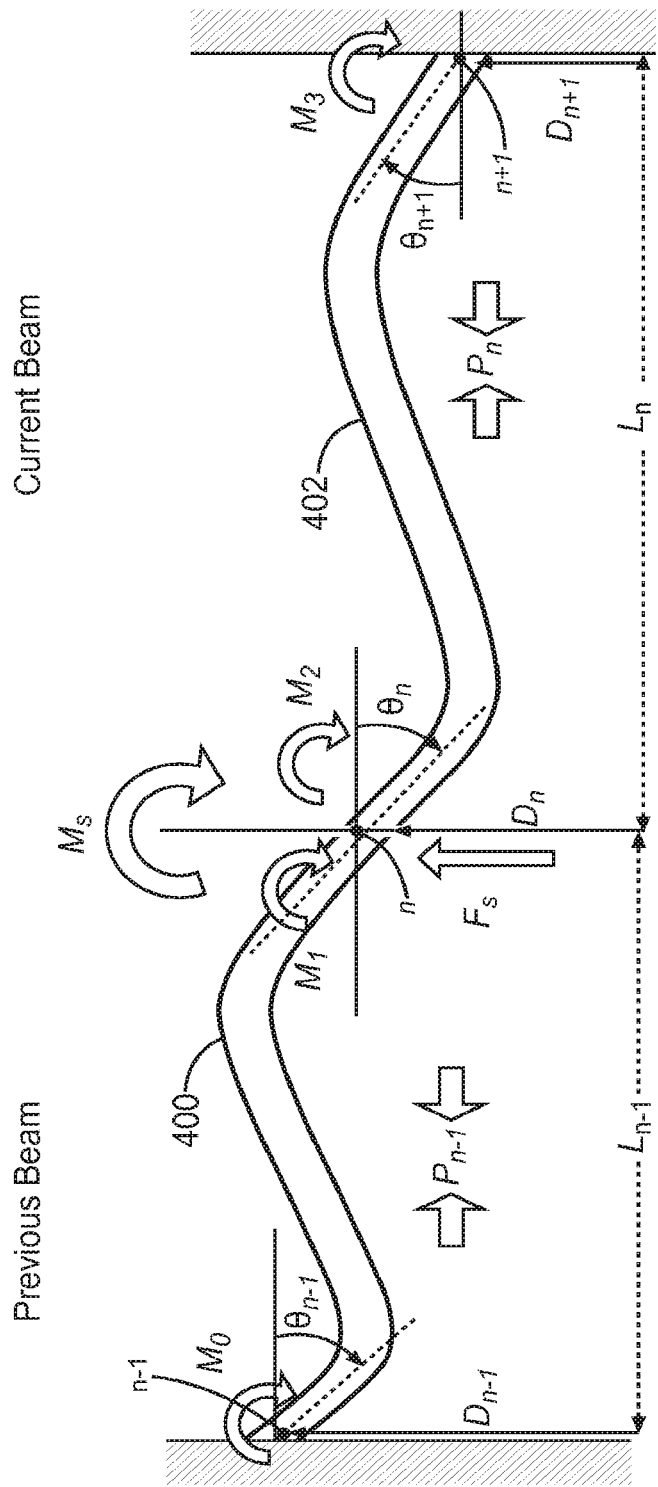
FIG. 9 is a schematic diagram that illustrates the basis of a calculation to determine the curvature of the drill string of FIG. 1, which may be used in the process described in FIG. 7.

At sub-step 204 of step 200, the calculated bending moments may be used to model the curvature of drill string 32 by balancing the moments at various nodes defined along the length of the drill string. For example, FIG. 9 illustrates two beam sections, a "previous" beam section 400 and a "current" beam section 402, with a central "current" node n defined at the intersection of the two beam sections. The other ends of the previous and current beam sections 400, 402 define the "previous" node n−1 and "next" node n+1, respectively. The previous beam section 400 has a known length $L_{n-1}$ and is subjected to a known average axial force $P_{n-1}$. Likewise, the current beam section 402 has a known length $L_n$ and is subjected to a known average axial force $P_n$.

A single node solution is illustrated by holding the distal ends of beam sections 400, 402 fixed and allowing central node n freedom to move in both angle $\theta_n$ and displacement $D_n$. That is, previous node n−1 is held encastre, oriented at a known angle $\theta_{n-1}$, displaced a known distance $D_{n-1}$, and subject to an internal moment $M_0$. Next node n+1 is also held encastre, but it is oriented at an unknown angle $\theta_{n-1}$, displaced an unknown distance $D_{n+1}$, and subject to an internal moment $M_3$. Current node n is not fixed, oriented at an unknown angle $\theta_n$, displaced an unknown distance $D_n$, and subject to known internal moments $M_2$ and $M_3$, external moment $M_8$, and external force $F_s$. The moment balance at current node n is given as:

$$M_0 = F_s L_{n-1}(\theta_{n-1} + C_{n-1}\theta_n + (1+C_{n-1})(D_n - D_{n-1})/L_{n-1}) \quad \text{(Equation 3)}$$

where $C_{n-1}$ is a carryover factor for moment transfer.

This moment balance may be solved to determine, for the current node n, the angle $\theta_n$ and displacement $D_n$, while giving consideration to the beam stiffness for the beam sections 400, 402. Beam stiffness $K_s$ is given as:

$$K_s = 4EI/L \quad \text{(Equation 4)}$$

where E is the elastic modulus, I is the area moment of inertia of the beam cross-section, and L is the length of the beam section.

Referring back to FIGS. 7 and 8, concurrently with the moment balance, the total force exerted on drill string 32 (FIG. 1) is calculated at sub-step 206. Within the elements used to calculate total force, mathematical model 300 includes a friction factor 336 that affects the calculation of the total force.

At sub-steps 204 and 206, the system of equations for determining both the curvature of the drill string and the total force may be solved by iteration until a convergence between the calculated parameters is obtained.

Having thus computed the total drill string force, a calculated weight on bit value 306 is compared with the measured weight on bit value 376 determined by measurement tool 100, as described hereinafter with reference to step 236.

Sub-step 208 of step 200 represents calculating the torque values throughout drill string 32. The incremental torque T may vary along the length of drill string 32. This may occur, for example, when a portion of the drill string rubs against the formation, or otherwise experiences binding, which may cause a very low incremental torque in one portion of the drill string 32, while causing another portion of the drill string to experience very high incremental torque.

Accordingly, mathematical model 300 may take into account a best estimate of the true wellbore trajectory, which may be described by a set of inclination and azimuth values versus depth that are may be determined by calculating the drill string curvature in sub-step 204.

Within the elements used to calculate torque, mathematical model 300 includes a tortuosity factor 338 that affects the calculation of the incremental torque.

With incremental torque along drill string 32 thus computed, a particular computed torque corresponds with the location of measurement tool 100. That is, it most closely represents the "torque on bit." This particular computed torque 308 is compared with the measured torque at bit 378 determined by measurement tool 100, as described hereinafter with reference to step 238.

At step 220, which may occur concurrently and independently of the execution of mathematical model 300 of step 200, measurement tool 100 measures a bending moment value 372 at the drill bit, a weight on bit value 376, and a torque on bit value 378, as described hereinabove. These values are provided to the control system 50 that is executing the mathematical model 300.

At step 230, mathematical model 300 may be calibrated in real-time or near-real-time using the measured bending at bit value 372, measured weight on bit value 376, and torque on bit value 378 to iteratively refine modeling elements. In particular, at sub-step 232, if the calculated bending at bit value 302 differs by more than a predetermined bending moment value from the measured bending at bit value 372, then the buckling limit factor 332 may be adjusted so as to bring a subsequently computed bending at bit value into equivalence with the measured bending at bit value 372. At sub-step 236, if the calculated weight on bit value 306 differs by more than a predetermined weight value from the measured weight on bit value 372, then the friction factor 336 may be adjusted so as to bring a subsequently computed weight on bit value into equivalence with the measured weight on bit value 372. Similarly, at sub-step 238, if the calculated torque on bit value 308 differs by more than a predetermined torque value from the measured torque on bit value 378, then the tortuosity factor 338 may be adjusted so as to bring a subsequently computed torque on bit value into equivalence with the measured torque on bit value 372.

In this manner, the mathematical model is calibrated so that its modeling of the parameters at measurement tool 100 agrees with the actual measured parameters at that location. Although merely a single check point along an entire elongate drill string 32 (FIG. 1), the calibration will ideally improve the accuracy of the modeling along the entire length of the drill string. The calibration also should improve the accuracy of mathematical model 300 in the event that measurement tool 100 should fail, and it allows the assumptions and accuracy of a drilling model to be improved when drilling subsequent wellbores even without the benefit of a measurement tool 100.

Sub-steps 232, 236, and 238 may occur concurrently and independently of one another, or they may occur in a series in a particular sequence, so that one calculated value matches its measured counterpart before the other comparisons are made and factors adjusted. Furthermore, although the described method and system incorporates all three sub-steps 232, 236, and 238, any one or two sub-steps may be used without the remaining sub-step(s) to improve accuracy of mathematical model 300.

In lieu of comparing bending at bit values in step 232, or in addition to it, the curvature of measurement tool 100 itself may be calculated, and changes in azimuth and inclination across the length of the tool 100 may be calculated. These values may be compared to the curvature and orientation data produced by mathematical model 300 that correspond to the measurement tool, thereby providing an additional level of confidence in the accuracy of the model.

The bending moment and the curvature relationship may be given as:

$$\kappa = \frac{M}{EI} \quad \text{(Equation 5)}$$

where M is the measured bending moment at the bit 372, κ is the curvature of measurement tool 100, E is Young's modulus, and I is the moment of inertia. Curvature κ may have the units of deg./100 ft. or deg./30 m, for example.

Curvature κ may be calculated, and it may be equated using a dog leg severity relationship to thereby allow calculation of the overall angle change over the length of measurement tool 100, as follows.

$$\kappa = \delta = 100\frac{\beta}{L} \qquad \text{(Equation 6)}$$

where δ represents dog leg severity, β is the overall angle change in the dogleg across measurement tool 100, and L is the length of the measurement tool 100.

Having thus calculated the overall angle change β across measurement tool 100, the change in inclination and direction over the length of the measurement tool 100 may be determined by the following relationship:

$$\beta = \arccos(\cos \Delta\epsilon \sin \alpha_n \sin \alpha + \cos \alpha \cos \alpha_n) \qquad \text{(Equation 7)}$$

where β is the bending angle, α is the inclination in radians at the upper end of measurement tool 100, $\alpha_n$ is the inclination at the lower end of measurement tool 100, and Δε is the change in direction (e.g., azimuth) from the upper end to the lower end of measurement tool 100. This inclination and direction data produced by measurement tool 100 may be compared directly to the relevant curvature data modeled in step 204.

Referring back to step 200, the execution of mathematical model 300 includes the sub-step 210 of estimating the stretch or elongation of drill string 32 (FIG. 1). In an embodiment, performance of sub-step 210 does not occur until after mathematical model 300 has been fully calibrated at step 230 so that its modeling of the parameters affecting measurement tool 100 agrees with the actual measured parameters at that location. In this manner, the model used to calculate drill string stretch will be most accurate before processor bandwidth is expended on the calculation. However, in an alternate embodiment, stretch is calculated at sub-step 210 independently of calibration step 230, and it is simply recalculated with greater accuracy during each subsequent iteration of step 200.

Total drill string stretch or elongation includes four primary components: Stretch due to axial force, stretch due to pressure effect (i.e., ballooning), stretch due to buckling, and stretch due to temperature changes, as follows.

$$\Delta L_{stretch} = \Delta L_a + \Delta L_p + \Delta L_b + \Delta L_t \qquad \text{(Equation 8)}$$

where $\Delta L_{stretch}$ is the total stretch, $\Delta L_a$ is the stretch due to axial force, $\Delta L_p$ is the stretch due to pressure, $\Delta L_b$ is the stretch due to buckling, and $\Delta L_t$ is the elongation due to temperature change.

The calculation of the elongation due to the axial load is based on Hooke's Law and consists of the change in the length due to the constant load in the drill string and the change in the length due to the linear change in the axial load. It is given by:

$$\Delta L_a = \frac{F_T L}{AE} + \frac{\Delta F_T L}{2AE} \qquad \text{(Equation 9)}$$

where $F_T$ is the true tensile axial force acting at the point of reference determined by the pressure area method, ΔF is the change in pressure area axial force over the component length L, A is the cross sectional area of the component, and E is the Young's modulus of the component material.

A ballooning effect causes elongation of the string due to the differential pressure from the inside to the outside of the drill string, which is given by the following equation:

$$\Delta L_P = \frac{-vL_P}{E(R^2-1)}[L(\rho_s - R^2\rho_u) + 2(P_s - R^2 P_u)] \qquad \text{(Equation 10)}$$

where $\Delta L_p$ is the change in length due to the ballooning mechanism, $L_p$ is the length of the drill string component element, R is ratio of the component outside diameter to the inside diameter, E is the Young's modulus of the component material, v is the Poisson's ratio of the component material, $\rho_s$ is the mud density inside the drill string component, $\rho_a$ is the mud density in the annulus at the depth of the drill string component, $P_s$ is the surface pressure on the drill string side, and $P_a$ is surface pressure on the annulus side.

Referring back to FIG. 1, in a vertical wellbore, drill string 32 naturally tends to hang straight down, while in a deviated wellbore, the drill string naturally lays on the low side of the wellbore. However, because drill string 32 is confined within the wellbore 60, the application of sufficiently high compressive loads on drill string 32, which may include thermal and pressure loads, may cause drill string 32 to buckle into one of two states. In a vertical wellbore, buckling may cause the drill string to form a helix, and in a deviated wellbore, buckling may cause the drill string to take a lateral S-shaped configuration.

The stretch due to buckling is related to buckling strain. According to the Lubinski buckling model, Buckling strain $e_b$ is the buckling length change per unit length. Accordingly, $\Delta L_b$ is given by the following formula:

$$\Delta L_b = \int_{z_0}^{z_1} e_b dz \qquad \text{(Equation 11)}$$

where $z_0$ and $z_1$ are defined by the distribution of the buckling force $F_b$.

Buckling strain is given by the following relationship:

$$e_b = -\tfrac{1}{2}/(r\theta') \qquad \text{(Equation 12)}$$

where r is the inside radius of the drill string and θ' is the rate of change the buckling-induced helix angle of the drill string with respect to drill string length, in radians/ft.

For the case of lateral buckling, the actual shape of the θ' curve can be integrated numerically to obtain the relationship of Equation 13 below, while for a helical buckling mode, buckling strain $e_b$ is given by Equation 14 below.

$$e_{bavg} = -.7285\frac{r^2}{4EI}F_b^{0.08}(F_b - F_p)^{0.92} \qquad \text{(Equation 13)}$$

$$e_b = -\frac{r^2}{4EI}F_b \qquad \text{(Equation 14)}$$

where E is Young's modulus, I is the moment of inertia, r is the inside radius of the drill string, $F_b$ is the buckling force, and $F_p$ is a threshold Paslay buckling force, which depends on the loading placed on the drill string from contact points with the wellbore, the distributed buoyed weight of the drill string, and inclination, azimuth, and bending stiffness of the drill string, among other factors.

The buckling force $F_b$ is given by:

$$F_b = -F_a + p_i r_i^2 - p_o r_o^2 \qquad \text{(Equation 15)}$$

where $F_b$ is the buckling force in lbf, $F_a$ is the axial force in lbf, $p_i$ is the pressure inside of the drill string in psi, $p_o$ is the pressure outside of the drill string in psi, $r_i$ is the inside radius of the drill string, and $r_o$ is the outside diameter of the drill string.

Finally, the thermal induced stretch is given by the following equation:

$$\Delta L_t = L \alpha \Delta t \quad \text{(Equation 16)}$$

where $\alpha$ is the coefficient of thermal expansion, which is defined as the fractional increase in length per unit rise in temperature, with units of in/in/F (with values of $6.9 \times 10^{-6}$ for steel, $10.3 \times 10^{-6}$ for aluminum and $4.9 \times 10^{-6}$ for titanium), and $\Delta t$ is the average temperature change in degrees F.

More accurately the thermal induced stretch can be given in integral form:

$$\Delta L_t = \int_0^L L\alpha \Delta t(z) dz = \alpha \left[ \Delta t_0 + \frac{\Delta t}{\Delta z} \frac{L^2}{2} \right] \quad \text{(Equation 17)}$$

where z is the measured depth and $\Delta L$ is the measured calculation interval.

Referring back to FIGS. 7 and 8, step 200, the execution of mathematical model 300, includes the sub-step 212 of estimating the total twist of drill string 32 (FIG. 1). In an embodiment, performance of sub-step 212 does not occur until after mathematical model 300 has been fully calibrated at step 230 so that its modeling of the parameters affecting measurement tool 100 agrees with the actual measured parameters at that location. In this manner, the model used to calculate drill string twist will be most accurate before processor bandwidth is expended on the calculation. However, in an alternate embodiment, twist is calculated at sub-step 212 independently of calibration step 230, and it is simply recalculated with greater accuracy during each subsequent iteration of step 200.

The torque and twist relationship is given as:

$$\theta = \frac{TL}{JG} \quad \text{(Equation 18)}$$

where $\theta$ is the angle of twist in radians (which can be greater than $2\pi$), T is torque in ft.·lbf., J is the polar moment of inertia (in.$^4$), and G is the modulus of rigidity in psi. The modulus of rigidity G is in turn given by:

$$G = \frac{E}{2(1+v)} \quad \text{(Equation 19)}$$

where E is the modulus of elasticity in psi and v is Poisson's ratio.

For a string with multiple sections n, the total angle of twist can be determined by summing the incremental twists of the sections, as follows:

$$\theta = T \sum_{i=1}^{n} \frac{L_i}{J_i G_i} \quad \text{(Equation 20)}$$

As described hereinabove, measurement tool 100 determines torque at bit value 378 by measuring the angle between position sensors 102 and 202 and using Equation 1 to calculate torque. In sub-step 230, the calculated torque on bit 308 from mathematical model 300 is compared to the measured torque at bit value 378. However, in one embodiment, the twist ($\varphi_r$-$\varphi_b$) between position sensors 102 and 202 may be compared directly with the modeled twist calculated at sub-step 212 that corresponds with the measurement tool 100, either in addition to, or in lieu of comparing torques, and the tortuosity factor 338 adjusted accordingly.

In summary, method for drilling a wellbore, method for estimating a condition of a drill string, and a drilling system have been described. Embodiments of the method for drilling a wellbore may generally include computing a first calculated value of a parameter associated with a location along a drill string disposed in the wellbore using a mathematical model, the mathematical model including a mathematical factor, the first calculated value being a function of at least the mathematical factor when the mathematical factor has an initial magnitude; measuring by at least one sensor that is carried by the drill string at the location a property related to the parameter; determining a measured value of the parameter using the measured property; assigning a corrected magnitude to the mathematical factor based on a comparison of the first calculated value to the measured value; and then computing a second calculated value of the parameter associated with the location in the drill string using the mathematical model having the mathematical factor with the corrected magnitude; wherein the second calculated value is closer to the measured value than is the first calculated value. Embodiments of the method for estimating a condition of a drill string may generally include calculating a weight, a torque, and a bending moment at a distal point in the drill string at a first moment in time using a mathematical model, the mathematical model including a friction factor, a tortuosity factor, and a buckling limit factor; providing a measurement tool disposed in the drill string near the distal point; measuring by the measurement tool a weight, a torque, and a bending moment near the distal point at or near the first moment in time; comparing the measured weight with the calculated weight; adjusting the friction factor if the calculated weight differs from the measured weight by a predetermined weight value; comparing the measured torque with the calculated torque; adjusting the tortuosity factor if the calculated torque differs from the measured torque by a predetermined torque value; comparing the measured bending moment with the calculated bending moment; adjusting the buckling limit factor if the calculated bending moment differs from the measured bending moment by a predetermined bending moment value; and calculating a weight, a torque, and a bending moment at the distal point at a second moment in time using the mathematical model with at least one from the group consisting of the adjusted friction factor, the adjusted tortuosity factor, and the adjusted buckling limit factor. Embodiments of the drilling system may generally have a drill string carrying a drill bit at a distal end; an apparatus operable to rotate and translate the drill string; a measurement tool disposed along the tool string and operable to measure a property that is indicative of the measured value of a drilling parameter at the measurement tool; and a control system arranged for executing a mathematical drilling model, the model being operable to iteratively compute calculated values of the drilling parameter at the measurement tool and adjust a modeling factor so that the calculated values converge with the measured value.

Any of the foregoing embodiments may include any one of the following elements or characteristics, alone or in combination with each other: Positioning a measurement tool along the drill string at the location; the measurement tool including the at least one sensor; the measurement tool includes at least first and second position sensors, a force sensor, and a bending sensor; the parameter is one from the group consisting of a torque, a twist, an axial force, a position, an azimuth, an inclination, and a bending moment; the location is near a distal end of the drill string; the parameter is torque on bit; the mathematical factor is a tortuosity factor; measuring a change in angular position between the at least one sensor and a second sensor due to an application of incremental torque on the drill string; the at least one sensor and the second sensor being separated by a predetermined axial distance; computing the torque on bit from the change in angular position; the location is near a distal end of the drill string; the parameter is weight on bit; the mathematical factor is a friction factor; the parameter is bending at bit; the mathematical factor is a buckling limit factor; estimating using the mathematical model with the second calculated value at least one from the group consisting of an elongation of the drill string and a twist of the drill string; iteratively computing calculated values of the parameter; iteratively determining measured values of the parameter; iteratively comparing the calculated values to the measured values; iteratively adjusting the mathematical factor; the mathematical model is a torque-drag drilling model; developing a drilling plan; drilling a first portion of the wellbore in accordance with the drilling plan; adjusting the drilling plan based on the second calculated value; drilling a second portion of the wellbore in accordance with the adjusted drilling plan; calculating an elongation of the drill string using the mathematical model with at least one from the group consisting of the adjusted friction factor, the adjusted tortuosity factor, and the adjusted buckling limit factor; calculating a twist of the drill string using the mathematical model with at least one from the group consisting of the adjusted friction factor, the adjusted tortuosity factor, and the adjusted buckling limit factor; the measurement tool includes first and second position sensors and is arranged to measure an angular twist across the measurement tool; the drilling parameter is a torque on bit; the modeling factor is a tortuosity factor; the measurement tool includes at least one bend sensor and is arranged to measure a bending moment at the measurement tool; the drilling parameter is bending at bit; the modeling factor is a buckling limit factor; the measurement tool includes at least one force sensor and is arranged to measure a force at the measurement tool; the drilling parameter is weight on bit; the modeling factor is a friction factor; the measurement tool is capable of communicating with the control system via a wellbore telemetry system; and the control system is arranged for executing the mathematical drilling model in real-time.

The Abstract of the disclosure is solely for providing the United States Patent and Trademark Office and the public at large with a way by which to determine quickly from a cursory reading the nature and gist of technical disclosure, and it represents solely one or more embodiments.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

What is claimed:

1. A method for drilling a wellbore, comprising:
calculating, by a computer system, a first set of values for drilling parameters associated with a location along a drill string disposed in said wellbore using a mathematical drilling model, the drilling parameters including a weight of the drill string, an incremental torque, and a bending moment of the drill string resulting from at least one of an axial force or a rotational force applied to the drill string for drilling a first portion of the wellbore, and the mathematical drilling model including a friction factor representing a magnitude of the weight, a tortuosity factor representing a magnitude of the incremental torque, and a buckling limit factor representing a magnitude of the bending moment;
acquiring, by the computer system from at least one sensor that is carried by the drill string, measurements related to each of the drilling parameters at said location along the drill string as the first portion of the wellbore is drilled in accordance with a drilling plan;
determining, by the computer system, actual values of the drilling parameters at said location along the drill string, based on the acquired measurements;
comparing, by the computer system, the first set of values calculated for the respective drilling parameters with their corresponding actual values determined from the measurements acquired for each drilling parameter at said location along the drill string;
adjusting, by the computer system, the mathematical drilling model based on the comparison, wherein the adjusting includes:
adjusting the friction factor when the calculated and actual values of the weight differ by more than a predetermined weight value;
adjusting the tortuosity factor when the calculated and actual values of the incremental torque differ by more than a predetermined torque value; and
adjusting the buckling limit factor when the calculated and actual values of the bending moment differ by more than a predetermined bending moment value;
calculating, by the computer system, a second set of values for the drilling parameters associated with said location along the drill string using said adjusted mathematical drilling model, wherein the second set of calculated values are closer to the actual values of the corresponding drilling parameters than the first set of calculated values;
adjusting, by the computer system, the drilling plan based on the second set of calculated values; and
controlling, by the computer system, the drill string for drilling a second portion of the wellbore in accordance with the adjusted drilling plan.

2. The method of claim 1, further comprising:
positioning a measurement tool along said drill string at said location, said measurement tool including said at least one sensor.

3. The method of claim 2, wherein:
said measurement tool includes at least first and second position sensors, a force sensor, and a bending sensor.

4. The method of claim 1, wherein:
the drilling parameters further include a twist, an axial force, a position, an azimuth, and an inclination of the drill string; and
each of the first and second sets of values is calculated as a function of an angle of the twist resulting from at least one of the axial force or the rotational force applied to the drill string for drilling the respective first and second portions of the wellbore.

5. The method of claim 1, wherein:
said location is near a distal end of said drill string; and
said incremental torque is torque on bit.

6. The method of claim 5, further comprising:
measuring a change in angular position between said at least one sensor and a second sensor due to an application of incremental torque on said drill string, said at least one sensor and said second sensor being separated by a predetermined axial distance; and
computing said torque on bit from said change in angular position.

7. The method of claim 1, wherein the mathematical drilling model further includes a mathematical factor for calculating values of an additional parameter associated with the location along the drill string, and wherein:
said location is near a distal end of said drill string; and
said additional parameter is weight on bit.

8. The method of claim 1, wherein the mathematical drilling model further includes a mathematical factor for calculating values of an additional parameter associated with the location along the drill string, and wherein:
said location is near a distal end of said drill string; and
said additional parameter is bending at bit.

9. The method of claim 1, further comprising:
estimating using said adjusted mathematical drilling model with said second calculated value at least one from the group consisting of an elongation of said drill string and a twist of said drill string.

10. The method of claim 1, wherein the mathematical drilling model further includes a mathematical factor for calculating values of an additional parameter associated with the location along the drill string, and the method further comprising:
iteratively computing calculated values of said additional parameter;
iteratively determining measured values of said additional parameter;
iteratively comparing said calculated values to said measured values of said additional parameter; and
iteratively adjusting said mathematical factor.

11. The method of claim 1, wherein:
said mathematical drilling model is a torque-drag drilling model.

12. A drilling system comprising
a drill string carrying a drill hit at a distal end;
an apparatus operable to rotate and translate said drill string;
a measurement tool disposed along said drill string and operable to measure values of drilling parameters at a location of said measurement tool along the drill string, the drilling parameters including a weight of the drill string, an incremental torque, and a bending moment of the drill string resulting from at least one of an axial force or a rotational force applied to the drill string for drilling a first portion of a wellbore; and
a control system arranged for executing a mathematical drilling model, the mathematical drilling model including a friction factor representing a magnitude of the weight, a tortuosity factor representing a magnitude of the incremental torque, and a buckling limit factor representing a magnitude of the bending moment, and the control system being operable to:
iteratively calculate values of the drilling parameters at the location of the measurement tool along the drill string;
adjust the mathematical drilling model so that said calculated values converge with said measured values, wherein the adjusting includes:
adjusting the friction factor when the calculated and actual values of the weight differ by more than a predetermined weight value;
adjusting the tortuosity factor when the calculated and actual values of the incremental torque differ by more than a predetermined torque value; and
adjusting the buckling limit factor when the calculated and actual values of the bending moment differ by more than a predetermined bending moment value; and
control the drill string for drilling a second portion of the wellbore in accordance with the adjusted mathematical drilling model.

13. The drilling system of claim 12 wherein:
said measurement tool includes first and second position sensors and is arranged to measure an angular twist across said measurement tool, wherein values of the incremental torque are calculated as a function of the angular twist; and
said incremental torque is a torque on bit.

14. The drilling system of claim 12 wherein:
said measurement tool includes at least one bend sensor and is arranged to measure the bending moment at said location of the measurement tool; and
said control system iteratively calculates values of bending at bit.

15. The drilling system of claim 12 wherein:
said measurement tool includes at least one force sensor and is arranged to measure a force at said location of the measurement tool; and
said control system iteratively calculates values of weight on bit.

16. The drilling system of claim 12 wherein:
said measurement tool is capable of communicating with said control system via a wellbore telemetry system.

17. The drilling system of claim 12 wherein:
said control system is arranged for executing said mathematical drilling model in real-time.

* * * * *

UNITED STATES PATENT AND TRADEMARK OFFICE
CERTIFICATE OF CORRECTION

PATENT NO. : 10,975,679 B2
APPLICATION NO. : 15/037298
DATED : April 13, 2021
INVENTOR(S) : Robello Samuel Page 1 of 1

It is certified that error appears in the above-identified patent and that said Letters Patent is hereby corrected as shown below:

In the Claims

Column 17, Line 47, change "hit" to -- bit --

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*